US012605810B2

(12) United States Patent
Liao

(10) Patent No.: US 12,605,810 B2
(45) Date of Patent: Apr. 21, 2026

(54) CONNECTOR WITH A QUICK-RELEASE DEVICE

(71) Applicant: COMLOCK ENTERPRISE CO., LTD., Taichung City (TW)

(72) Inventor: Nian-Hao Liao, Taichung City (TW)

( * ) Notice: Subject to any disclaimer, the term of this patent is extended or adjusted under 35 U.S.C. 154(b) by 546 days.

(21) Appl. No.: 18/139,334

(22) Filed: Apr. 25, 2023

(65) Prior Publication Data

US 2024/0359300 A1 Oct. 31, 2024

(51) Int. Cl.
*B25B 23/00* (2006.01)
*B25B 13/46* (2006.01)
*B25B 13/48* (2006.01)

(52) U.S. Cl.
CPC .......... *B25B 23/0035* (2013.01); *B25B 13/46* (2013.01); *B25B 13/483* (2013.01)

(58) Field of Classification Search
CPC ............ B25B 23/0007; B25B 23/0035; B25B 13/483; B25B 13/461; F16B 2/16; F16B 21/12; F16B 21/16; F16B 21/165; F16B 7/042; Y10T 403/592
See application file for complete search history.

(56) References Cited

U.S. PATENT DOCUMENTS 4,480,511 A * 11/1984 Nickipuck .......... B25B 23/0035 81/177.85
4,692,073 A * 9/1987 Martindell .............. B25B 21/00 279/82
5,013,194 A * 5/1991 Wienhold ........... B23B 31/1071 279/22
5,813,296 A * 9/1998 Hoff .................... B25B 23/0035 81/177.85
6,006,632 A * 12/1999 Hsieh .................. B25B 23/0021 81/177.85
6,109,140 A * 8/2000 Roberts ............... B25B 23/0035 81/177.85
6,145,416 A * 11/2000 Bonniot .............. B25B 23/0035 81/177.8
6,874,392 B1 * 4/2005 Wu ..................... B25B 23/0021 81/177.85
8,070,377 B2 * 12/2011 Wang .................... B25B 15/001 81/177.85
10,421,175 B2 * 9/2019 Chou ........................ B25H 3/04
10,464,194 B2 * 11/2019 Su ........................ B25B 23/0021
10,919,132 B2 * 2/2021 Huang ................ B25B 23/0028
2002/0162426 A1 * 11/2002 Lee ..................... B25B 23/0035 81/177.85
2004/0146342 A1 * 7/2004 Lin ..................... B25B 23/0035 403/324

(Continued)

FOREIGN PATENT DOCUMENTS

CN 2618731 Y 6/2004
CN 2707436 Y 7/2005

(Continued)

*Primary Examiner* — Jonathan P Masinick
(74) *Attorney, Agent, or Firm* — BruceStone LLP; Joseph A. Bruce

(57) ABSTRACT

A hand tool includes a handle, a socket and a connector. The connector includes a first end for connection to the handle and a second end for connection to the socket. The connector includes quick-release device. Thus, the second end of the connector can be connected to or detached from the socket easily.

5 Claims, 9 Drawing Sheets

(56) References Cited

U.S. PATENT DOCUMENTS

| | | | | |
|---|---|---|---|---|
| 2005/0145078 | A1* | 7/2005 | Chuan | B25B 23/0035 81/177.85 |
| 2007/0189847 | A1* | 8/2007 | Lee | B25B 23/0035 403/322.1 |
| 2009/0226248 | A1* | 9/2009 | Wang | B25B 15/001 403/322.2 |
| 2012/0321374 | A1* | 12/2012 | Ray | F16C 11/0609 403/111 |
| 2024/0139917 | A1* | 5/2024 | Lin | B25B 13/461 |

FOREIGN PATENT DOCUMENTS

| | | | | |
|---|---|---|---|---|
| DE | 20006677 | U1 * | 6/2000 | B25B 23/0021 |
| DE | 202011050037 | U1 * | 9/2011 | B25B 23/0035 |
| DE | 202014103273 | U1 * | 7/2014 | B25B 23/0035 |
| EP | 1457292 | A1 * | 9/2004 | B25B 23/0035 |
| GB | 2437265 | A * | 10/2007 | B25B 23/0057 |

* cited by examiner

CONNECTOR WITH A QUICK-RELEASE DEVICE

BACKGROUND OF INVENTION

1. Field of Invention

The present invention relates to a hand tool and, more particular, to connector for use with a hand tool.

2. Related Prior Art

An internal-combustion engine that consumes gasoline or liquidated gasoline gas includes a plug for igniting the gasoline of liquidated gasoline gas. The plug is formed with a thread engaged with a thread formed on an internal portion of the engine. To rotate the plug relative to the engine, a handle 10 that includes a socket 11 is used.

Chinese Patent No. 2618731Y discloses a hand tool including a T-shaped handle securely connected to a socket 2. That is, T-shaped handle and the socket 2 are made in one piece. In operation, the socket 2 receives a plug. Plugs of different sizes require sockets of different sizes. Hence, plugs of different sizes require hand tools of different sizes, with each of the hand tools including a T-shaped handle. To carry such hand tools of different sizes is a heavy burden for a user physically or financially.

Chinese Patent No. 2707436Y discloses a hand tool including a socket 1, a T-shaped handle 2, a universal joint 12, a pivot 11 for connecting the universal joint 12 to the socket 1, and a pivot 13 for connecting the universal joint 12 to the T-shaped handle 2. The pivots 11 and 13 are rivets that render it difficult to disconnect the socket 1 or the T-shaped hand 2 from the universal joint 12. As mentioned above, plugs of different sizes require sockets of different sizes. Hence, plugs of different sizes require hand tools of different sizes, with each of the hand tools including a T-shaped handle. To carry such hand tools of different sizes is a heavy burden for a user physically or financially.

The present invention is therefore intended to obviate or at least alleviate the problems encountered in the prior art.

SUMMARY OF INVENTION

It is the primary objective of the present invention to provide a convenient connector between a handle and a socket of a hand tool.

To achieve the foregoing objective, the connector includes a joint, a core, a detent, a shank and a pin. The joint includes a square rod, a lateral hole, a small axial hole, a medium axial hole and a large axial hole. The square rod extends from an end of the joint. The lateral hole is made in the square rod. The small axial hole is made in the square rod and in communication with lateral hole. The medium axial hole is in communication with the small axial hole. A first shoulder is formed between the medium and small axial holes. The large axial hole is in communication with the medium axial hole. A second shoulder is formed between the large and medium axial holes. The core is movable in the medium and small axial holes and includes a stepped lateral face formed with a deep portion and shallow portion. The detent includes an internal portion in contact with the stepped lateral face and external portion extensible out of the lateral hole. The shank includes a ball inserted in the large axial hole of the joint. The ball includes a slot. The pin is inserted in the joint so that the pin extends throughout the slot of the ball. When the ball is in a lower position in the joint, the core is in a lower position in the joint so that the deep portion of the stepped lateral face receives the internal portion of the detent to allow complete withdrawn of the external portion of the detent in the lateral hole. When the ball is in an upper position in the joint, the core is in an upper position in the joint so that the shallow portion of the stepped lateral face receives the internal portion of the detent, thereby extending the external portion of the detent out of the lateral hole.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
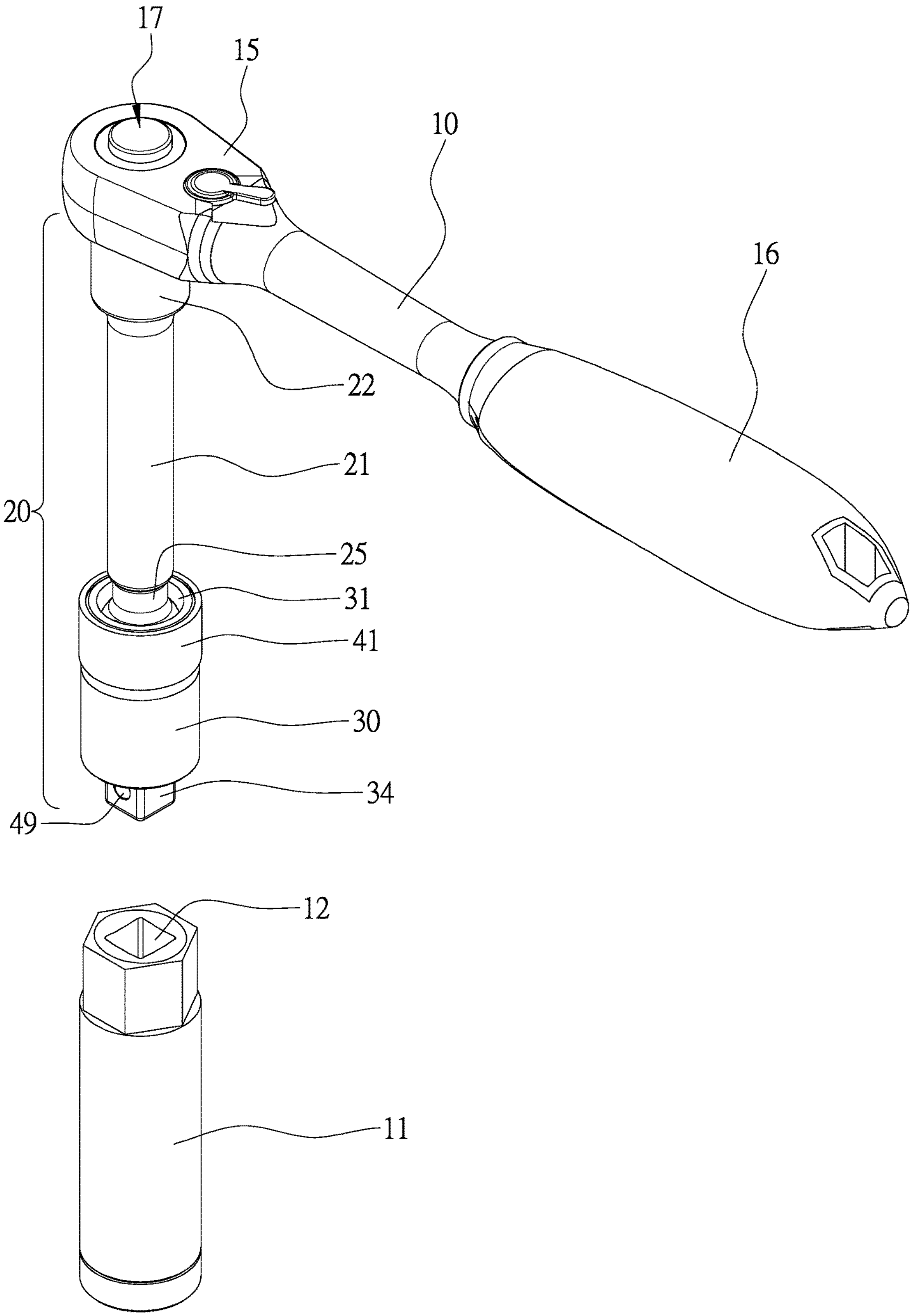
FIG. 1 is a perspective view of a hand tool according to the first embodiment of the present invention.

Referring to FIG. 1, a hand tool such as a ratchet or one-way wrench includes a handle 10, a socket 11 and a connector 20 according to a first embodiment of the present invention. The handle 10 is connected to the socket 11 via the connector 20.

The handle 10 includes a head 15 at an end and a grip 16 at an opposite end. The head 15 contains a driving unit 17 switchable between two modes. In the first mode, the driving unit 17 allows the handle 10 to rotate the connector 20 or the socket 11 clockwise but not counterclockwise. In the second mode, the driving unit 17 allows the handle 10 to rotate the connector 20 or the socket 11 counterclockwise but not clockwise. The driving unit 17 will not be described in detail for not being the spirit of the present invention.

Figure 2:
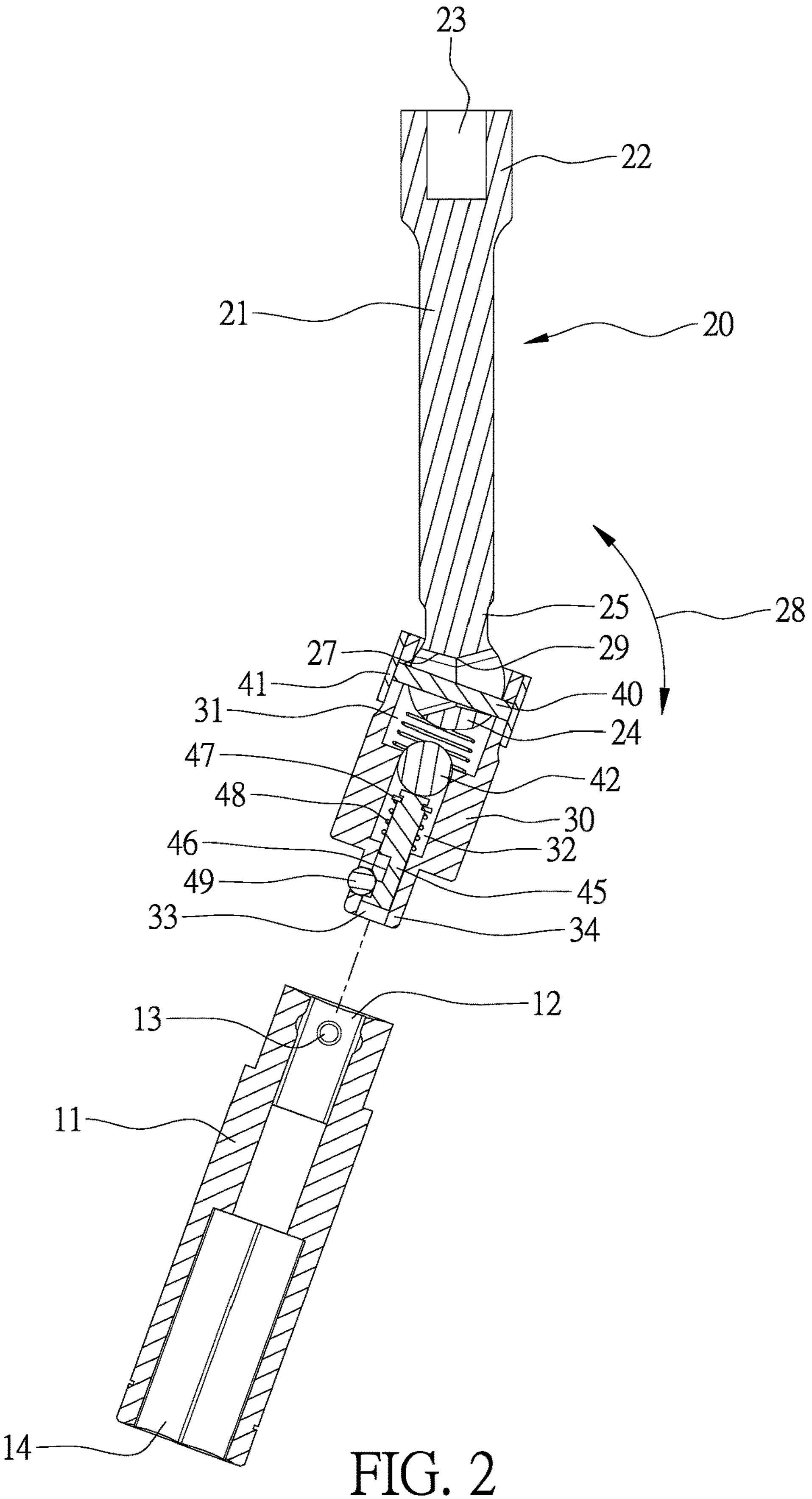
FIG. 2 is a cross-sectional view of the hand tool shown in FIG. 1.

Referring to FIG. 2, the socket 11 includes a square bore 12 in an end and a hexagonal bore 14 in an opposite end. The square bore 12 is defined by four faces. Each of the faces is made with a cavity 13. In use, the square bore 12 receives a square portion of the connector 20 or a square portion (not shown) of the driving unit 17, and the hexagonal bore 14 receives a plug (not shown).

Figure 3:
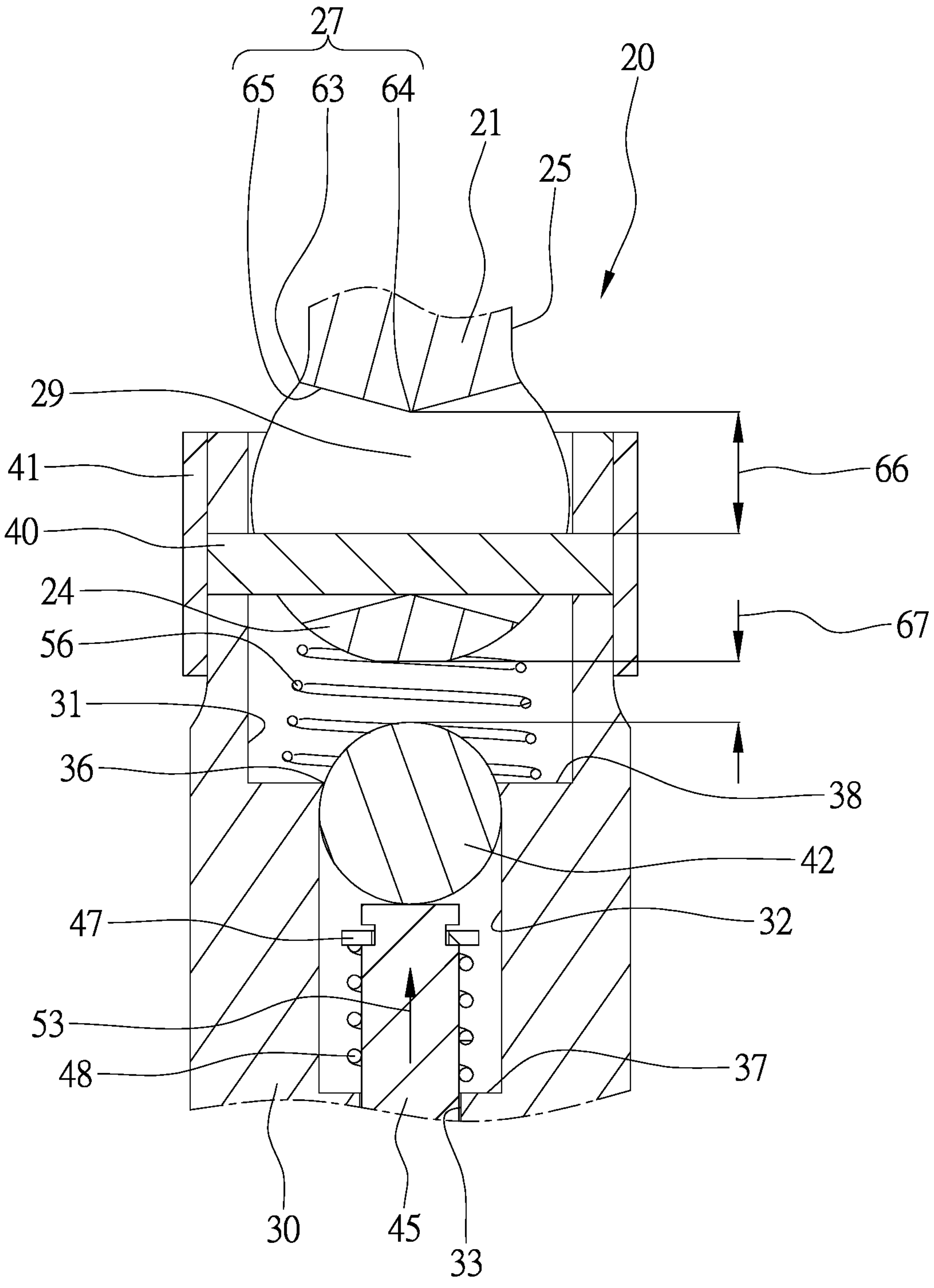
FIG. 3 is an enlarged partial view of the handle tool shown in FIG. 2.
Figure 4:
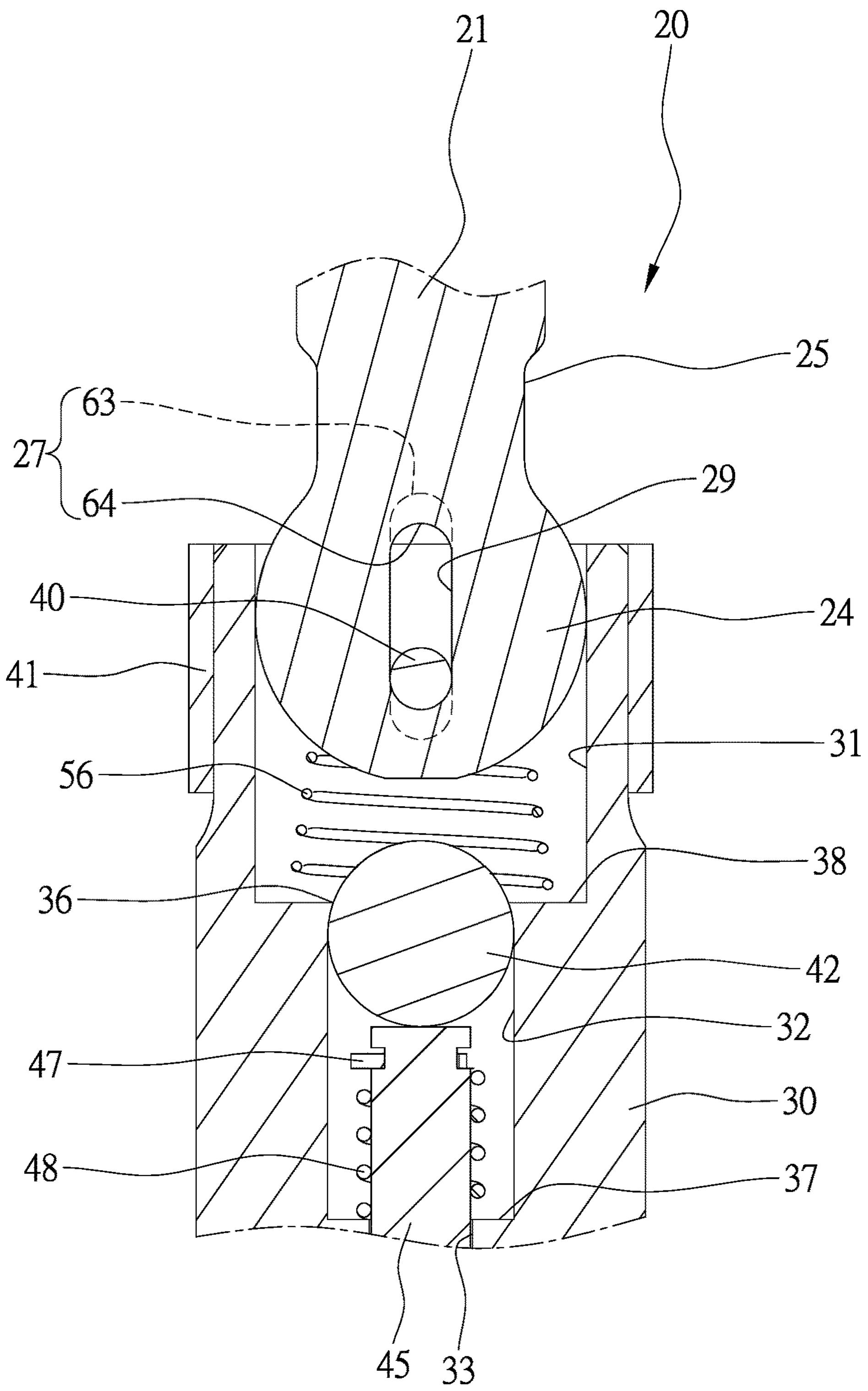
FIG. 4 is another enlarged partial view of the handle tool depicted in FIG. 2.

Referring to FIGS. 2 through 4, the connector 20 includes a shank 21, a joint 30 and a pin 40, a collar 41, a sphere 42, a core 45, a C-clip 47, a spring 48, a detent 49 and a spring 56.

The shank 21 includes a receptacle 22 at an end, a ball 24 at an opposite end, and a reduced section 25 next to the ball

24. The receptacle 22 includes a square bore 23 to receive the square portion of the driving unit 17 of the handle 10. The ball 24 includes a flat portion 68 at the free end and two recesses 27 respectively in two lateral portions. Each of the recesses 27 includes a wide portion 63 and a narrow portion 64. The narrow portions 64 of the recesses 27 are in communication with each other, thereby turning the combination of the recesses 27 with each other into a slot 29 in a middle portion of the ball 24. The slot 29 is defined by ceiling and a floor. The ceiling of the slot 29 includes a lowest point. The floor of the slot 29 includes a highest point. The wide portions 63 of the recesses 27 are exposed to the exterior of the ball 24. Each of recesses 27 is defined by upper and lower slant faces 65 (FIG. 3).

The joint 30 includes a large axial hole 31 in a first section, a small axial hole 33 in a second section, a medium axial hole 32 between the large axial hole 31 and the small axial hole 33, and a square rod 34 axially extending from the second section. The holes 31, 32 and 33 are in communication with one another. A diameter of the large axial hole 31 is larger than a diameter of the medium axial hole 32, thereby forming a shoulder 38 between the large axial hole 31 and the medium axial hole 32. The diameter of the medium axial hole 32 is larger than a diameter of the small axial hole 33, thereby forming a shoulder 37 between the medium axial hole 32 and the small axial hole 33. A lateral hole 51 (FIG. 6) is made in one of walls of the square rod 34. The lateral hole 51 is in communication with the small axial hole 33.

The pin 40 is transversely inserted in the first section of the joint 30. The pin 40 extends throughout the slot 29, which consists of the recesses 27. Thus, the pin 40 connects the first section of the joint 30 to the ball 24. That is, the ball 24 is kept rotatable in the large axial hole 31. That is, the shank 21 is pivotally connected to the joint 30. The reduced section 25 of the shank 21 allows a large angle of pivoting of the shank 21 relative to the joint 30.

In a first aspect, the shank 21 is pivotable relative to the joint 30 about the pin 40 for the pin 40 is pivotable in the slot 29. In a second aspect, as indicated by arrow heads 28 (FIG. 2), the shank 21 is pivotable relative to the joint 30 about an axis (not shown) that is in perpendicular to the pin 40 for the pin 40 is pivotable in the large axial hole 31. The pivoting of the shank 21 relative to the joint 30 in the second aspect is limited by the slant faces 65.

The spring 56 is in a conical shape. The spring 56 is inserted in the large axial hole 31. The spring 56 is compressed between the ball 24 and the shoulder 38 so that the spring 56 tends to push the ball 24 away from the joint 30. However, the pin 40 keeps the ball 24 in the large axial hole 31, i.e., keeping the shank 21 to the joint 30.

In another embodiment, the spring 56 can be in another shape or replaced with a stack of Belleville springs for example.

Preferably, the collar 41 tightly wraps the first section of the joint 30 to keep the pin 40 in the joint 30. That is, the connector 20 kept assembled.

The sphere 42 is inserted in the medium axial hole 32 before a first section of the core 45 is inserted in the medium axial hole 32. The first section of the core 45 is in contact with the sphere 42. The C-clip 47 is engaged with the first section of the core 45. The spring 48 is compressed between the C-clip 47 and the shoulder 37. Thus, the spring 48 exerts a force 53 on the sphere 42 via the core 45. The core 45 pushes the sphere 42 toward the joint 30 so that a portion of the sphere 42 is inserted in the large axial hole 31. However, the medium axial hole 32 includes a diameter-reduced section 36 next to the large axial hole 31 to keep the other portion of the sphere 42 in the medium axial hole 32. To this end, a diameter of the diameter-reduced section 36 of the medium axial hole 32 is smaller than a diameter of the sphere 42. There is a distance 67 between the sphere 42 and the ball 24. There is a distance 66 between an upper portion of the pin 40 and the lowest point of a ceiling of the slot 29. The distance 66 is larger than the distance 67.

The detent 49 is in the form of a ball. An internal portion of the detent 49 is always inserted in the small axial hole 33. An external portion of the detent 49 is located in or out of the lateral hole 51.

Figure 6:
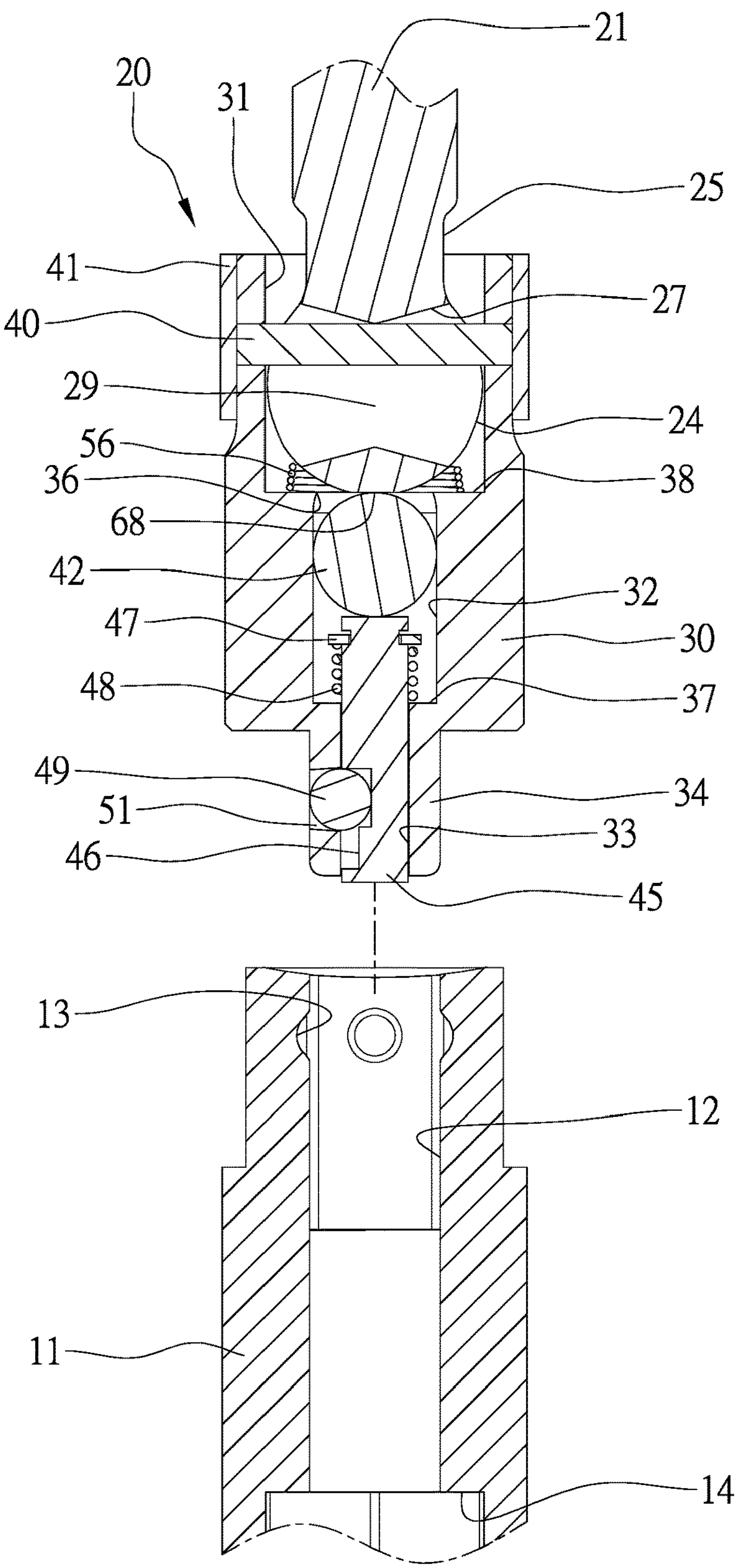
FIG. 6 is a cross-sectional view of the hand tool in another position than shown in FIG. 3.

The core 45 includes a stepped lateral face 46 formed with a deep portion and a shallow portion (FIG. 6). The deep or shallow portion of the stepped lateral face 46 is in contact with the detent 49.

Figure 5:
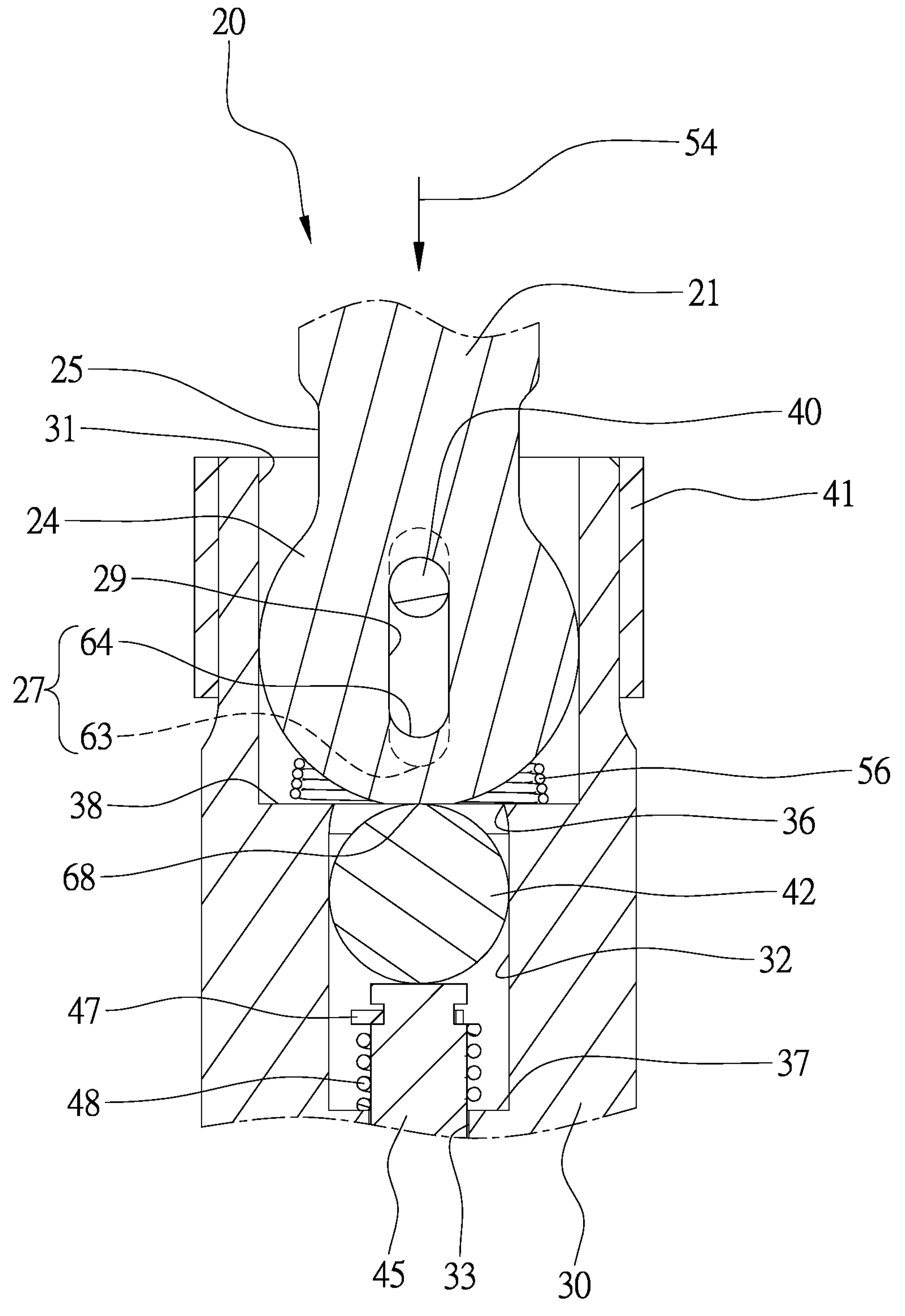
FIG. 5 is a cross-sectional view of the hand tool in another position than shown in FIG. 4.

Referring to FIGS. 5 and 6, an external force 54 is exerted on the shank 21, thereby pushing the shank 21 toward the joint 30. The flat portion 68 of the ball 24 pushes down the sphere 42, which in turn pushes down the core 45 to align the deep portion of the stepped lateral face 46 to the internal portion of the detent 49. The external portion of the detent 49 is allowed to completely enter the lateral hole 51. Hence, the square rod 34 can be inserted in or removed from the square bore 12.

Referring to FIGS. 2 through 4, after the external force 54 is removed, the spring 56 pushes the ball 24 upwards so that the highest point of the floor of the slot 29 is in contact with the pin 40. The spring 48 lifts the C-clip 47, which in turn lifts the sphere 42. The shallow portion of the stepped lateral face 46 abuts against the internal portion of the detent 49 so that the external portion of the detent 49 extends out of the lateral hole 51. Thus, the external portion of the detent 49 is inserted in one of the cavities 13 after the square rod 34 is inserted in the square bore 12. Hence, the square rod 34 is kept in the square bore 12, i.e., the joint 30 is kept to the socket 11.

Figure 7:
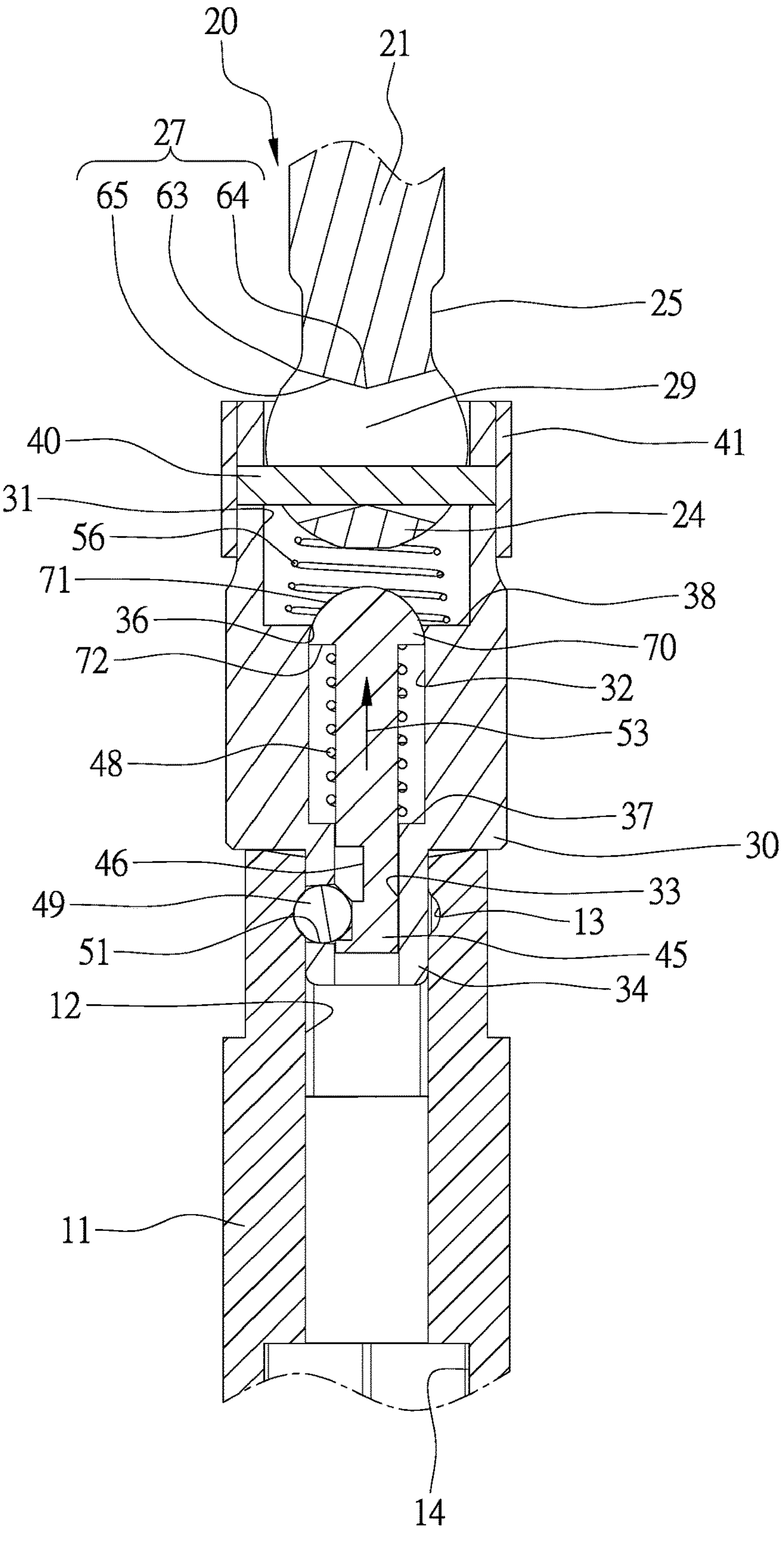
FIG. 7 is a partial cross-sectional view of a hand tool according to the second embodiment of the present invention.

Referring to FIG. 7, there is a connector 20 according to a second embodiment of the present invention. The second embodiment is identical to the first embodiment except for two things. Firstly, the core 45 includes an enlarged portion 70 instead of the sphere 42. Secondly, the enlarged portion 70 of the core 45 is formed with a shoulder 72 instead of the C-clip 47. The spring 48 is compressed between the shoulder 72 and the shoulder 37. Additionally, the core 45 includes a convex face 71 located opposite to the shoulder 72. The convex face 71 is for contact with the flat portion 68 of the ball 24.

Figure 8:
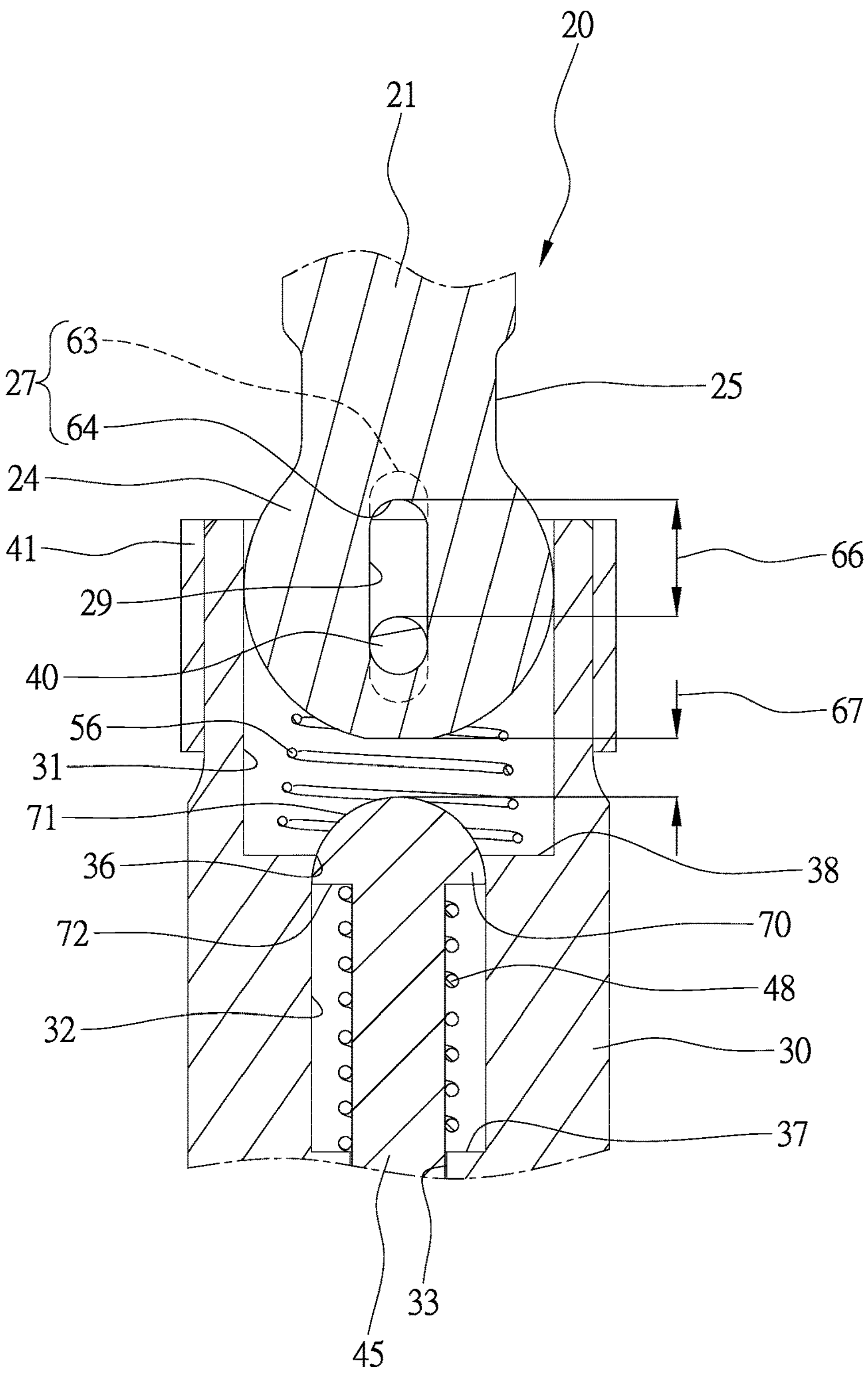
FIG. 8 is another cross-sectional partial view of the handle tool depicted in FIG. 7.

Referring to FIG. 8, the distance 67 of the convex face 71 from the flat portion 68 of the ball 24 is shorter than the distance 66 of the upper portion of the pin 40 from the lowest point of the ceiling of the slot 29.

Figure 9:
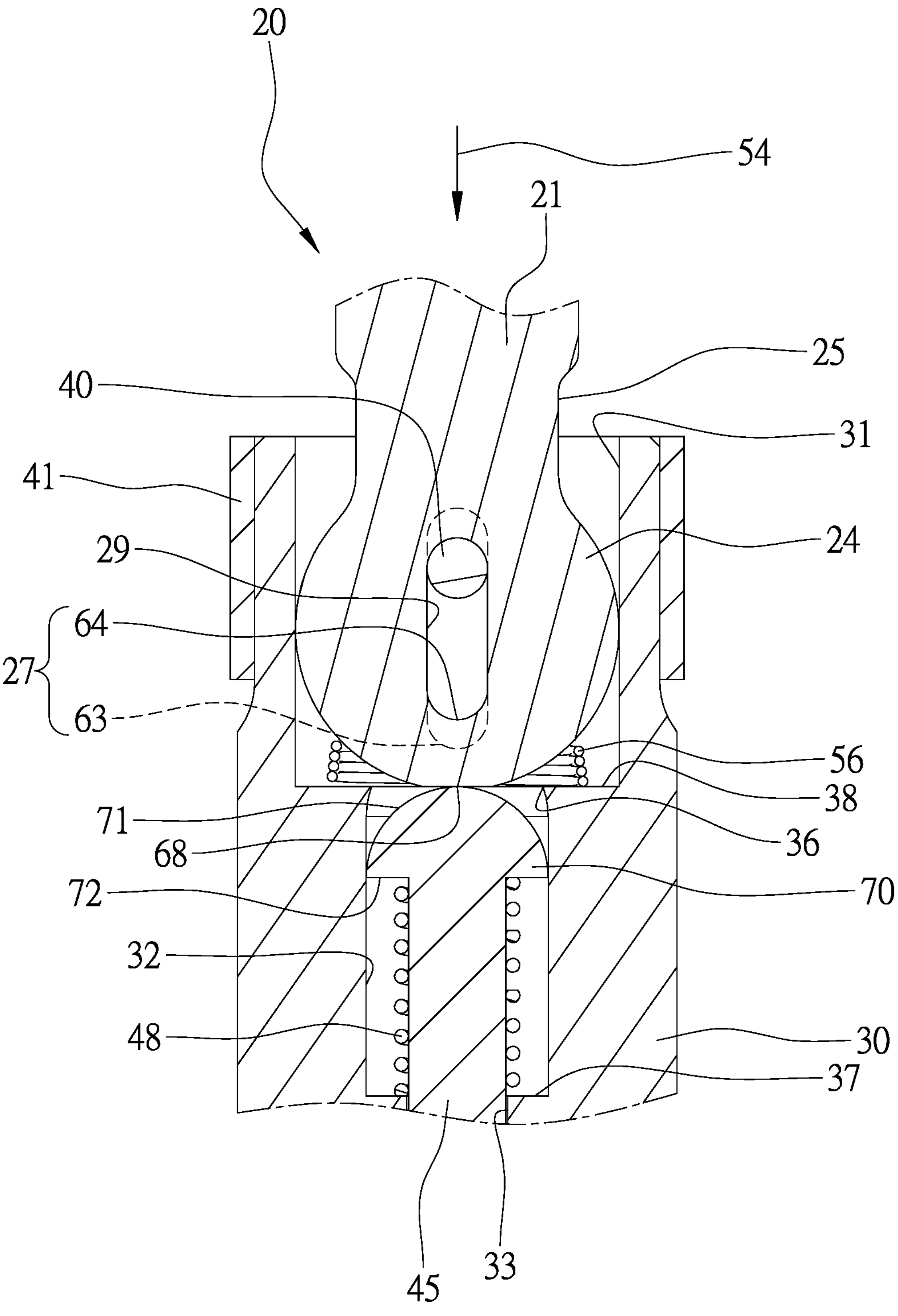
FIG. 9 is a cross-sectional view of the hand tool in another position than shown in FIG. 8.

Referring to FIG. 9, an external force 54 is exerted on the shank 21 so that the lowest point of the ceiling of the slot 29 abuts against the pin 40. The flat portion 68 of the ball 24 abuts against the convex face 71 of the enlarged portion 70 of the core 45.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A connector comprising:

a joint comprising a square rod at an end, a lateral hole in the square rod, a small axial hole in the square rod and in communication with the lateral hole, a medium axial hole in communication with the small axial hole, a first shoulder between the medium and small axial holes, a large axial hole in communication with the medium axial hole, and a second shoulder between the large and medium axial holes;

a core movable in the medium and small axial hole, wherein the core comprises a stepped lateral face formed with a deep portion and a shallow portion;

a detent comprising an internal portion in contact with the stepped lateral face and external portion extensible out of the lateral hole;

a shank comprising a ball inserted in the large axial hole of the joint, wherein the ball comprises a slot;

a sphere between the core and the ball; and a pin inserted in the joint so that the pin extends throughout the slot of the ball;

wherein when the ball is in a lower position in the joint, the core is in a lower position in the joint so that the deep portion of the stepped lateral face receives the internal portion of the detent to allow complete withdrawn of the external portion of the detent in the lateral hole; and wherein when the ball is in an upper position in the joint, the core is in an upper position in the joint so that the shallow portion of the stepped lateral face receives the internal portion of the detent, thereby extending the external portion of the detent out of the lateral hole.

2. The connector according to claim 1, wherein the slot comprises two recesses, wherein each of the recesses comprises a wide portion exposed to an exterior of the ball and a narrow portion in communication with the narrow portion of the remaining one of the recesses.

3. The connector according to claim 1, further comprising a spring compressed between the second shoulder and the ball.

4. A connector comprising:

a joint comprising a square rod at an end, a lateral hole in the square rod, a small axial hole in the square rod and in communication with the lateral hole, a medium axial hole in communication with the small axial hole, a first shoulder between the medium and small axial holes, a large axial hole in communication with the medium axial hole, and a second shoulder between the large and medium axial holes;

a core movable in the medium and small axial holes, wherein the core comprises:

a stepped lateral face formed with a deep portion and a shallow portion; and an enlarged portion formed with a convex face;

a spring compressed between the first shoulder of the joint and the enlarged portion of the core;

a detent comprising an internal portion in contact with the stepped lateral face and an external portion extensible out of the lateral hole;

a shank comprising a ball inserted in the large axial hole of the joint, wherein the ball contacts the convex face of the enlarged portion of the core and comprises a slot; and a pin inserted in the joint so that the pin extends throughout the slot of the ball;

wherein when the ball is in a lower position in the joint, the core is in a lower position in the joint so that the deep portion of the stepped lateral face receives the internal portion of the detent to allow complete withdrawn of the external portion of the detent into the lateral hole; and wherein when the ball is in an upper position in the joint, the core is in an upper position in the joint so that the shallow portion of the stepped lateral face receives the internal portion of the detent, thereby extending the external portion of the detent out of the lateral hole.

5. The connector according to claim 4, further comprising a C-clip engaged with the core, wherein the spring is compressed between the C-clip and the first shoulder.

* * * * *